INVENTOR.
Luke D. Gillem

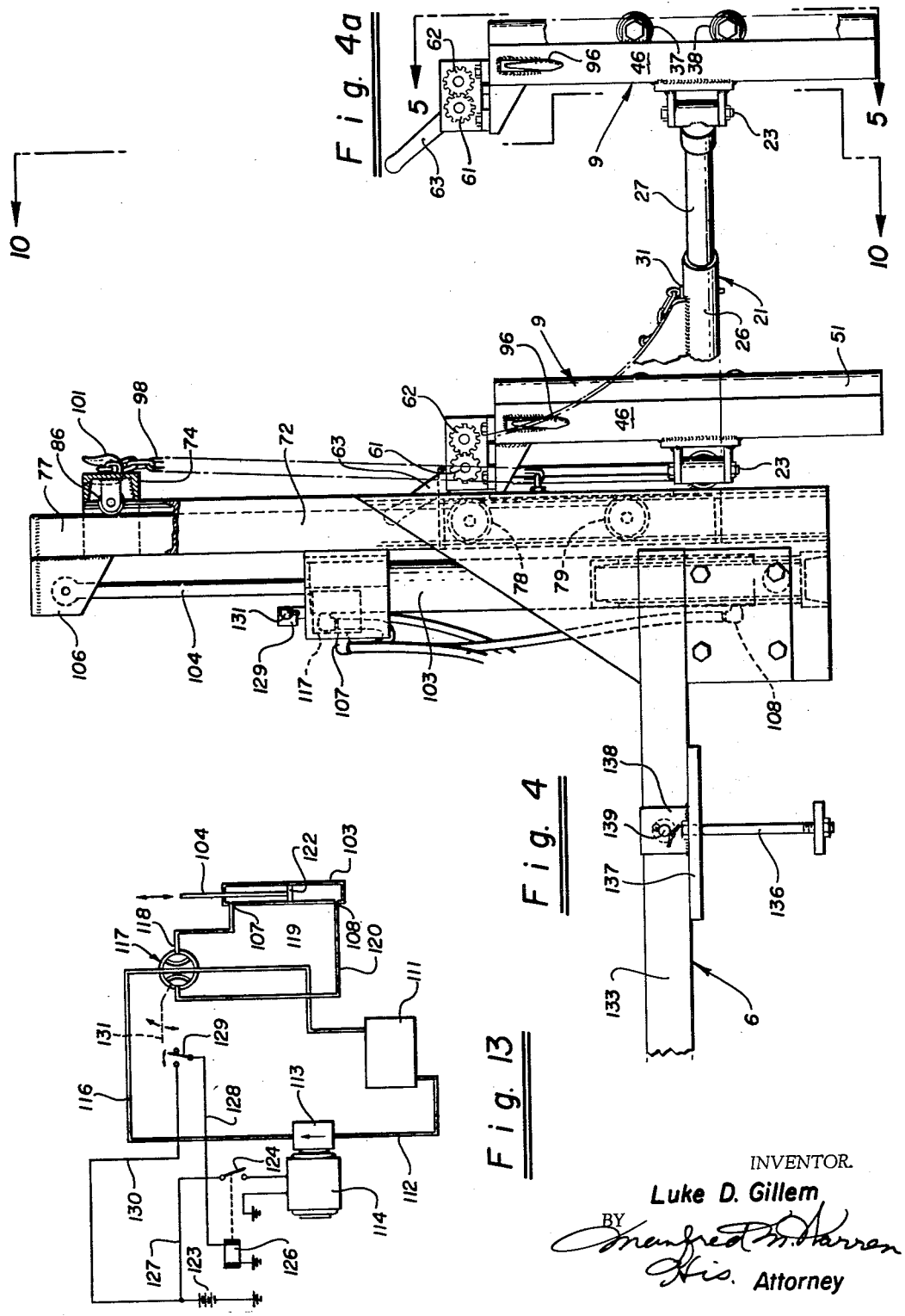
Oct. 27, 1964    L. D. GILLEM    3,154,205
VEHICLE ESCORTING APPARATUS
Filed Feb. 26, 1962    5 Sheets-Sheet 3
INVENTOR.
Luke D. Gillem
BY Manfred M. Warren
His Attorney Oct. 27, 1964    L. D. GILLEM    3,154,205
VEHICLE ESCORTING APPARATUS
Filed Feb. 26, 1962    5 Sheets-Sheet 4
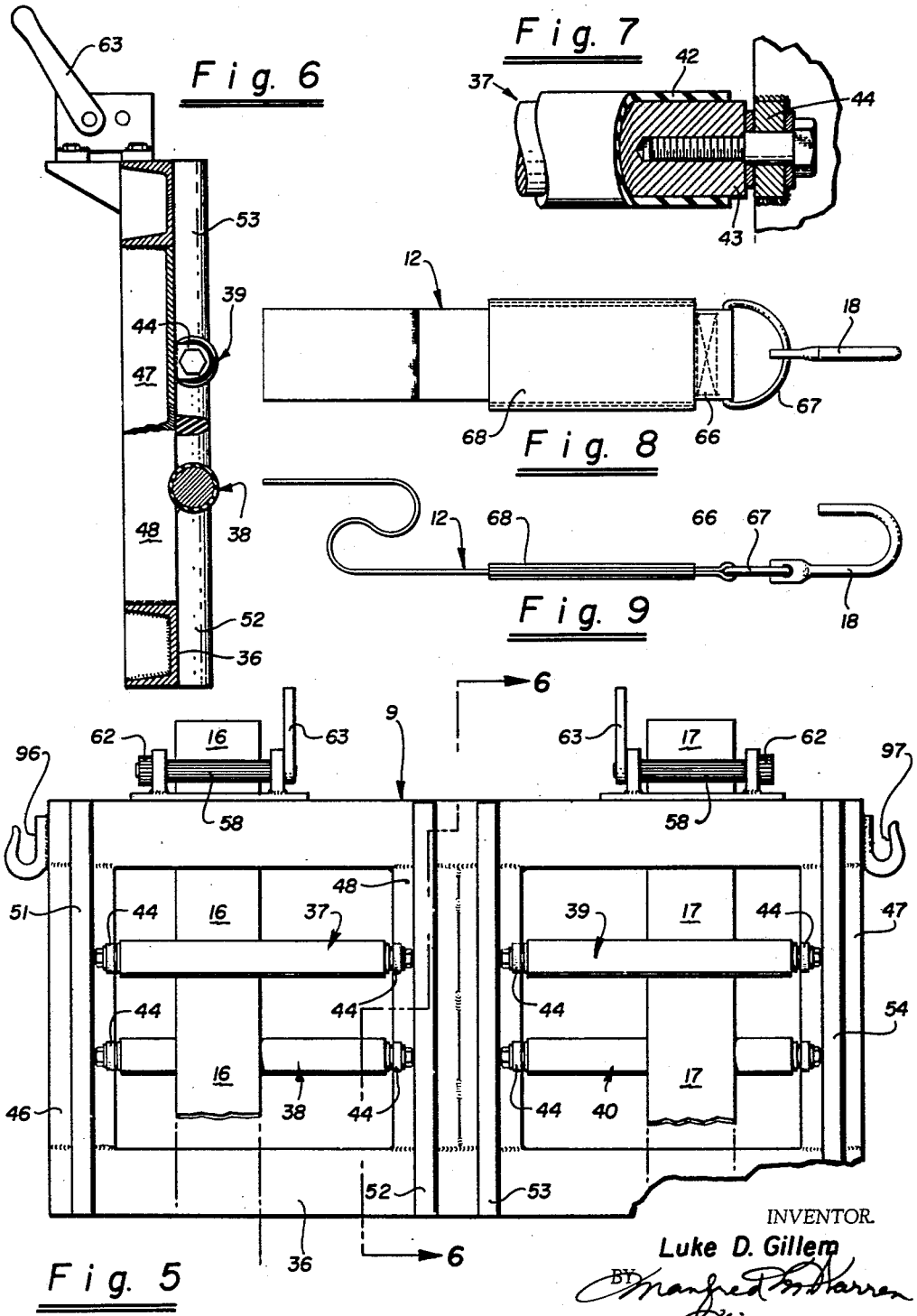

INVENTOR.
Luke D. Gillem

United States Patent Office 3,154,205
Patented Oct. 27, 1964

3,154,205
VEHICLE ESCORTING APPARATUS
Luke D. Gillem, Oakland, Calif., assignor to L. G. Lift Co., Inc., a corporation of California
Filed Feb. 26, 1962, Ser. No. 175,631
6 Claims. (Cl. 214—86)

The invention relates to tow truck type of vehicles and more particularly to an apparatus used in conjunction therewith for picking up the front end and for towing of a disabled automobile.

An object of the present invention is to provide an apparatus of the character described which is especially designed for attachment to and for use with existing truck equipment commonly used in and about a garage or service station business, and which is particularly adapted for addition to standard pickup trucks of one-half ton or larger to most readily convert the latter for tow truck operation at modest cost and without blocking or seriously interfering with access to the bed of the truck, whereby the truck may retain its performance as a general utility carrier.

Another object of the present invention is to provide an apparatus of the character described which is adaptable for front mounting on the escorting vehicle, thereby making the latter particularly useful on crowded roads where the tow truck may approach the disabled vehicle from the rear without crossing over or into the lane of oncoming traffic, thus enabling the removal of a disabled vehicle without blocking extra lanes of traffic or requiring traffic blocking and dangerous turn arounds of the tow truck.

A further object of the present invention is to provide an apparatus of the character described which may be quickly and easily attached to the disabled vehicle, and to take the latter under control with a minimum of required learning, skill or experience on the part of the operator; and wherein the apparatus is especially designed for universal attachment to all automobiles and to cradle the bumpers thereof in a padded support so as to insure the proper towing of the disabled vehicle without bending, marring or otherwise damaging the front end, bumper or grill of the disabled vehicle.

Still another object of the present invention is to provide an apparatus of the character described which has its own self-contained power unit, which may be used as a jack for elevating a disabled vehicle for tire change or repair, and may also be used to elevate the towing or escorting vehicle for tire change or repair.

A further object of the present invention is to provide an apparatus of the character above which is of simple and rugged construction capable of providing dependable, foolproof operation over a very long period of time.

Another object of the present invention is to provide an apparatus of the character described in which the disabled or escorted vehicle is firmly and safely supported for proper tracking and guidance without swaying, thereby enabling faster and safer towing of the disabled vehicle.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (five sheets):

FIGURE 4 is an enlarged side elevation of the rear mount apparatus illustrated in FIGURE 2.

FIGURE 4a is a fragmentary side elevation of a portion of the apparatus shown in FIGURE 4 in an extended position.

FIGURE 5 is a front elevation of a portion of the apparatus as taken at lines 5—5 of FIGURE 4a.

FIGURE 6 is a cross-sectional view of the apparatus taken substantially on the plane of line 6—6 of FIGURE 5.

FIGURE 7 is a fragmentary cross-sectional view taken substantially on the plane of line 7—7 of FIGURE 3.

FIGURE 8 is a plan view of a vehicle mounting strap forming part of the apparatus.

FIGURE 9 is a side view of the strap illustrated in FIGURE 8.

FIGURE 10 is a cross-sectional view of the apparatus taken substantially on the plane of line 10—10 of FIGURE 4a.

FIGURE 11 is a fragmentary cross-sectional view, on a further enlarged scale, taken substantially on the plane of line 11—11 of FIGURE 10.

FIGURE 13 is a diagrammatic view of the electric and hydraulic control system forming part of the apparatus.

Figure 1:
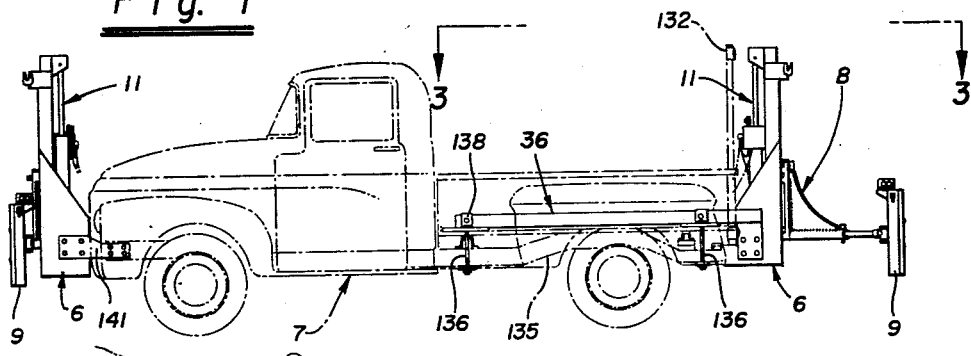
FIGURE 1 is a side elevation of apparatus constructed in accordance with the present invention mounted on both the front and rear ends of a conventional style pick-up truck.
Figure 2:
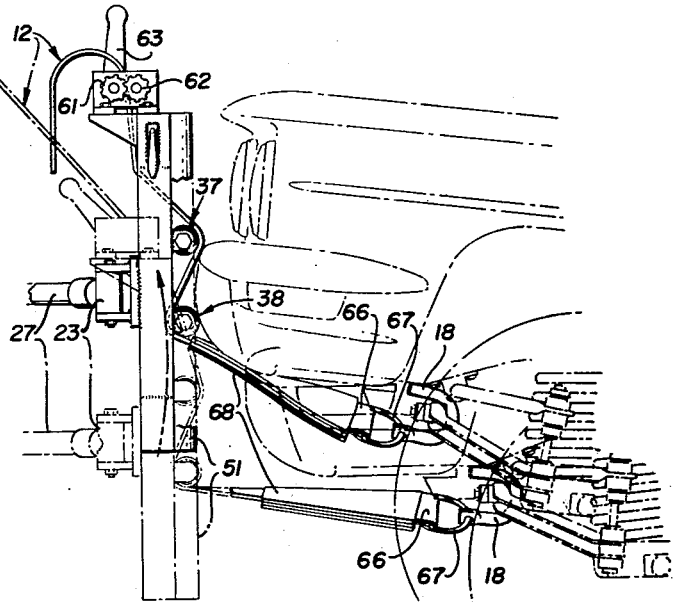
FIGURE 2 is a fragmentary side elevation, on an enlarged scale, showing the apparatus of the present invention and one end of a disabled vehicle coupled thereto.

The vehicle escorting apparatus of the present invention consists briefly of a support 6 adapted for connection to either the front or rear ends of an escorting vehicle 7, as illustrated in FIGURE 1; a carriage 8 mounted on the support for vertical reciprocation and including a horizontally offset transversely disposed and elongated bumper pad 9; power means 11 for raising the carriage; means 12, see FIGURES 8 and 9, for fastening the bumper 13 of the escorted vehicle in fixed, substantially parallel face to face engagement with the bumper pad 9; and vertical axis pivot means 14 adjacent the support providing the sole joint between the escorting and escorted vehicles, whereby a firm non-swaying pivotal connection is provided between the vehicles enabling fast and safe towing.

Figure 3:
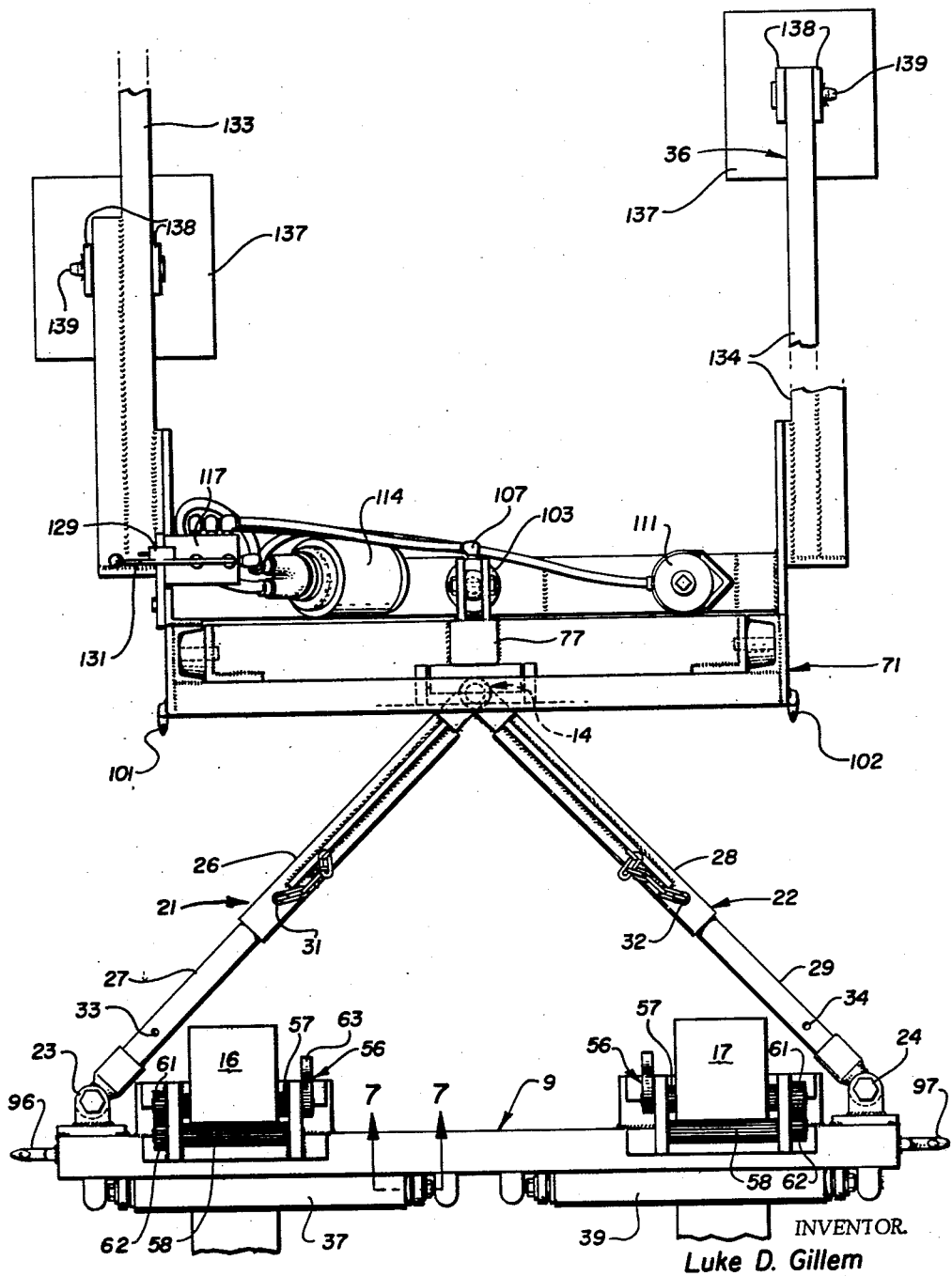
FIGURE 3 is an enlarged plan view of the apparatus mounted to the rear end of the pick-up truck in FIGURE 1.
Figures 10, 11:
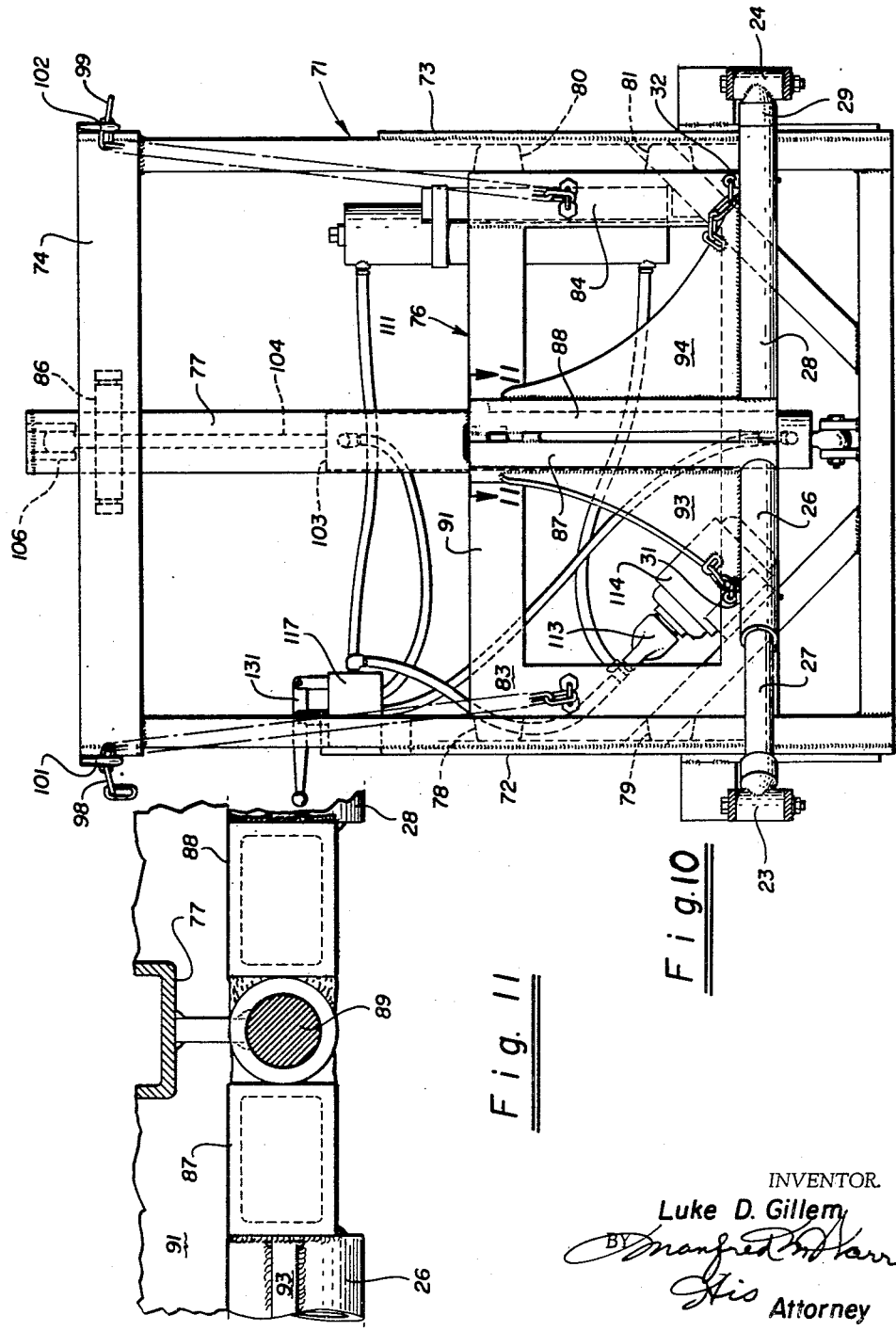

Preferably, and as best seen in FIGURE 3, the bumper pad 9 is of elongated form, and the fastening means 12 consists of a pair of transversely spaced straps 16 and 17 which are provided with hooks 18 for connection to the frame 19 of the escorted vehicle for drawing the bumper 13 against the bumper pad 9 at horizontally spaced positions to provide a fixed, substantially parallel face to face engagement of the bumper 13 and bumper pad 9 and for lifting the escorted vehicle. Preferably, also, the means of connection between the pad 9 and carriage 8 is formed for relative extension and retraction of the pad relative to the carriage, compare showings in FIGURE 1, and for locking the pad in adjusted position, thereby permitting adjustment of the length of the swinging radius provided for relative pivotal displacement of the escorting and escorted vehicles when the pad is in an operable relatively extended position spaced from the carriage, the arrangement providing also for the locking of the pad in an inoperative retracted position adjacent to the carriage, see the compacted arrangement of the apparatus at front end of FIGURE 1. The means for so connecting the pad and carriage here consists of a pair of arms 21 and 22 having a common vertical pivotal attachment 14 to the carriage and diverging longitudinally therefrom, as seen in FIGURE 3, and being connected to the pad 9 at vertical pivoting joints 23 and 24 adjacent the opposite ends of the pad. Each of the arms are here composed of extensible sections 26 and 27, in the case of arm 21, and 28 and 29, in the case of arm 22, sections 27 and 29 being here mounted within tubular sections 26 and 28 for telescopic extension and retraction. Means for locking the sections in an extended operable position and in a retracted inoperable position, here consists of pins 31 and 32 carried by the arm sections 26 and 28 and which may be threaded through aligned openings (not shown) in the arm sections when the arms are in an extended position, and through aligned openings, see openings 33 and 34 in sections 27 and 29 in FIGURE 3, when the arms are in a relatively retracted position. The relatively extended and retracted position of the pad 9 with respect to the carriage is also illustrated in FIGURES 4 and 4a. As will be seen from FIGURE 3, the arms 21 and 22 and pad 9 and their pivotal joints 14, 23 and 24 define a triangular assembly wherein the arms on retraction and extension articulate about the axes of these joints causing movement of the pad in successive parallel positions to and from the front of the carriage.

The bumper pad 9, as best seen in FIGURES 4 and 5, consists of a frame 36 which carries transversely spaced pairs of vertically spaced horizontally extending padded rollers 37, 38, 39 and 40 disposed for engagement with the bumper 13 of the disabled vehicle, the rollers being set forwardly of the frame, as seen in FIGURE 4, so as to nest the bumper therebetween. These rollers are each composed of a rubber tube 42, see FIGURE 7, mounted upon a core member 43 which is in turn demountably secured at its opposite ends to mounting lugs 44 projecting outwardly from vertical side and center sections 46, 47 and 48 of the frame 36. In this manner, the rolls 37–40 may be periodically removed for renewal of the rubber padding. Additionally, there is provided on the face of the frame 36 an elongated padding strip 51 on the vertical frame side 46; a pair of similar padding strips 52 and 53 set in horizontally spaced vertically extending relation on the center section 48; and a similar padding strip 54 mounted on the opposite frame side 47. By reason of the foregoing arrangement no metal touches the bumper of the escorted car.

Straps 16 and 17 may be conveniently threaded through the horizontal slot provided between the two pairs of rollers for drawing the bumper of the disabled car snugly up against the cushioned front of the bumper pad; and means 56 is carried by the bumper pad for cinching up the straps in their tensioned position. The latter means 56 here consists of a pair of belt cinching structures each including a pair of grooved or serrated rollers 57 and 58 journalled in spaced parallel relation, as seen in FIGURE 3, to define a belt gripping slot therebetween. The adjacent ends of the two rollers are preferably fitted with enmeshed pinions 61 and 62 for ensuring joint rotation of the rollers, and the rollers are eccentrically mounted so as to move together in their direction of rotation releasing the belts. In other words, belts 16 and 17 may be threaded up through the slots defined between the two rollers 57 and 58. A handle 63 on roller 57 may then be displaced to rotate the rollers into cinching engagement with the opposite sides of the belt, the belt then being held in tension against withdrawal since it is gripped by the rollers and further rotation of the rollers will cause them to move closer together, thus increasing their compressive holding of the belt.

The straps 16 and 17 are preferably composed of very strong, durable and weather resistant fabric such as woven nylon belting. One end portion 66 is here looped around a mounting ring 67 for hook 18 and suitably stitched or fastened, as seen in FIGURE 8. Additional padding 68 is also here used in the form of a fabric sleeve slipped over the belt 12 for engagement with the bumper and front end portion of the car so as to avoid marring or damaging the polished surfaces of bumpers and grills. Sleeve 68 may be similarly formed of woven nylon cord.

The support and mounting for the carriage 9 here includes a vertically set frame 71 having horizontally spaced vertically extending guide members 72 and 73 and a horizontally extending top member 74 connected at its opposite ends to the upper ends of the vertical guide members 72 and 73. The carriage here includes a frame 76 which is mounted on the guide members 72 and 73 for vertical reciprocation and is also provided with a vertically extending center member 77 having a length traversing the top member 74 on reciprocation and being supported by the top member 74 to resist turning moment of the carriage. Preferably, and as here shown, the side members 72 and 73 are of channel shape and receive therein pairs of rollers 78, 79, 80 and 81 mounted on the opposite side members 83 and 84 of the carriage frame 76. Also in the present construction, a roller 86 is mounted on the top member 74 for engaging and supporting the vertical center member 77 of the frame.

Arms 21 and 22 have their vertical hinged connection to the carriage frame 76 centrally thereof. For this purpose the arms are formed with integral base hinge sections 87 and 88 which have a length roughly corresponding to the vertical height of the carriage frame and are coaxially connected thereto by coaxially aligned vertical hinge pins 89 secured to the carriage frame at the front thereof adjacent the top and bottom cross members 91 and 92 of the frame. These hinge sections 87 and 88 are preferably formed integrally with the tubular arm sections 26 and 27 and are joined thereto by webs 93 and 94 to aid in supporting the applied loads.

Where the disabled vehicle has a wrecked front or rear end to be picked up by the apparatus of the present invention, it may be desirable to secure the disabled vehicle with a pair of chains instead of belts 16 and 17 in order to avoid cutting of the belts with torn metal of the disabled vehicle. For this purpose, a pair of standard chain hooks 96 and 97 are fastened to the opposite side sections 46 and 47 of the bumper pad member 9. Also, as a safety precaution, a pair of chains 98 and 99 are secured to the carriage and may be engaged over chain hooks 101 and 102 carried by the top piece 74 of the stationary frame 71 so as to serve as a double check for supporting the vertical load on the carriage during lifting and transportation of a disabled vehicle.

Figure 12:
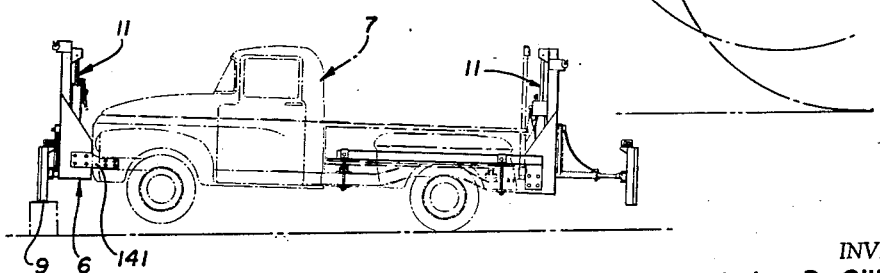
FIGURE 12 is a side elevation of the apparatus showing its use in raising one end of the towing vehicle.

The power means 11 for raising and lowering the carriage here consists of a hydraulic cylinder 103 secured at its lower end to the frame 6 and which is provided with a vertically projecting ram 104 which is secured at its upper end in a bracket 106 carried at the upper end of the vertically extending center member 77 of the carriage frame. In the present construction, the hydraulic cylinder 103 is provided with pressure inlet fittings 107 and 108 adjacent the upper and lower ends of the cylinder so that ram 104 may be power driven in either an upward or downward direction for either elevating a disabled vehicle or for elevating the towing vehicle itself. The latter operation is accomplished, as illustrated in FIGURE 12, wherein a ground support is placed under the bumper pad 9 and the ram 104 is driven downwardly so as to elevate the adjacent end of the escorting or towing vehicle. This operation is most convenient for changing a tire, mounting of chains or making other adjustment or repair on the towing vehicle.

The hydraulic control system for the apparatus is illustrated in FIGURE 13. Oil from a reservoir 111 is taken by conduit 112 to the intake side of pump 113 driven by electric motor 114. The discharge side of the pump 113 is connected by conduit 116 to a manually operated multiple position valve 117. The latter is also connected by conduit 118 to the upper cylinder fitting 107; by conduit 119 to the reservoir 111; and by conduit 120 to the lower fitting 108 on hydraulic cylinder 103. In the position of the valve, illustrated in FIGURE 13, conduits 118 and 120 are sealed off at the valve so that the piston 122 carried at the lower end of ram 104 is locked in adjusted position between the pressure inlet fittings 107 and 108; and conduits 116 and 119 are connected so as to provide a closed circuit between pump 113 and reservoir 111. Rotation of the core of valve 117 45° in a clockwise direction will place conduit 118 in registration with conduit 119 so as to vent the top end of the hydraulic cylinder to the reservoir; while simultaneously placing pressure conduit 116 in communication with conduit 120 thereby entering oil under pressure into the bottom fitting 108 of cylinder 103 and elevating the ram. Rotation of the valve core 45° in a counterclockwise direction, from the position illustrated in FIGURE 3, effects a reversal of flow in that conduit 118 becomes connected with pressure conduit 116 while conduit 120 becomes connected with the reservoir conduit 119 thereby causing a power driven downward stroke of ram 104. The electric circuitry for motor 114 here includes a battery 123, which may be the regular storage battery of the towing vehicle; a motor starting relay switch 124 connected in a power lead 127 from battery 123 and which is under the control of a solenoid 126 in turn connected by lead 128 and manual switch 129 and conductor 130 to battery 123. A manual control 131 is here shown for setting the position of valve 117, and this same control or a companion manual control may be used for opening and closing switch 129.

Elevated running lights 132, see FIGURE 1, may be provided and used as desired when a disabled vehicle is under tow.

As hereinbefore noted, the apparatus of the present invention may be conveniently mounted at either the front or the rear of the towing vehicle, see FIGURE 1. Where the apparatus is used at the rear of a pick-up truck, the supporting frame 6 is preferably provided with a pair of horizontally projecting rails 133 and 134 which are designed for mounting on the bed of the truck in direct overlying relation to the conventional longitudinal frame members 135 of the truck. U bolt fasteners 136 are preferably used for directly connecting rails 133 to the underlying frame members 135. As here shown, the upper ends of the U bolts 136 are secured to flat rail mounting plates 137 which are provided with spaced apart lugs 138 between which the rails 133 and 134 may be demountably secured by cross pins 139. In this manner the apparatus may be very quickly and easily installed in the bed of the truck or with equal facility removed therefrom.

Where the apparatus is to be mounted at the front of the pick-up vehicle, as illustrated in FIGURE 1, the frame support 6 is provided with rearwardly extending mounting brackets 141 which may be directly connected to the forward extremity of the vehicle frame members 135.

I claim:

1. A vehicle escorting apparatus comprising, a support adapted for connection to an escorting vehicle at one end thereof, a carriage mounted on said support for vertical reciprocation, an elongated bumper pad formed for engaging a bumper of an escorted vehicle, a pair of transversely spaced straps connected to said bumper pad and adapted for connection to the frame of the escorted vehicle for drawing said bumper against said pad at horizontally spaced positions to provide a fixed substantially parallel face to face engagement with said pad and for lifting said escorted vehicle, means connecting said pad and carriage for joint and equal vertical displacement and supporting said pad in fixed longitudinally spaced relation to said carriage and providing a pivotal connection at said carriage about a vertical axis to provide a swinging radius for relative pivotal displacement of the escorting and escorted vehicles, and power means for raising to adjusted elevated positions said carriage and pad thereby raising said straps and the connected end of the escorted vehicle, said power means locking said carriage and pad against vertical displacement in all adjusted elevated positions.

2. A vehicle escorting apparatus for comprising, a support adapted for connection to an escorting vehicle at one end thereof and including a vertical frame having horizontally spaced vertically extending channel-shaped guide members and a horizontally extending top member connecting said guide members, a carriage having rollers mounted thereon for rolling engagement with said guide members for vertical reciprocation and including a vertically extending center member having a length traversing said top member on reciprocation, a roller mounted on said top member engaging and supporting said vertical center member to resist a turning moment of said carriage and an elongated bumper pad formed for engaging a bumper of an escorted vehicle, a strap connected to said bumper pad and adapted for connection to the frame of the escorted vehicle for drawing said bumper against said pad and for lifting said escorted vehicle, a pair of arms connecting said pad and carriage and supporting said pad in longitudinally spaced relation to said carriage and providing a pivotal connection to said carriage about a vertical axis to provide a swinging radius for relative pivotal displacement of the escorting and escorted vehicles, and power means connecting said support and carriage for raising said carriage and pad and straps and the connected end of the escorted vehicle.

3. A vehicle escorting apparatus comprising, a support adapated for connection to an escorting vehicle at one end thereof, a carriage mounted on said support for vertical reciprocation, a bumper pad formed for engaging a bumper of an escorted vehicle, a strap connected to said bumper pad and adapted for connection to the frame of the escorted vehicle for holding said bumper against said pad and for lifting said escorted vehicle, a pair of arms having a common vertical pivotal attachment to said carriage and diverging longitudinally therefrom and being pivotally connected to said pad for supporting said pad in longitudinally spaced relation to said carriage and providing a swinging radius for relative pivotal displacement of the escorting and escorted vehicles, each of said arms being composed of extensible sections for adjusting the length of said radius and providing said pad with an operable relatively extended position spaced from said carriage by said radius and an inoperable retracted position adjacent said carriage, means for locking said sections in the operable and inoperable positions of said pad, and power means for raising said carriage and pad and straps and the connected end of the escorted vehicle, said arms being pivoted to said pad about horizontally spaced vertical axes thereby defining a triangular assembly of said arms and pad, said arms on retraction and extension articulating about said axes to permit movement of said pad in successive parallel positions to and from said support.

4. A vehicle escorting apparatus comprising: a support adapted for connection to an escorting vehicle at one end thereof; a carriage mounted on said support for vertical reciprocation; a frame having a plurality of horizontally spaced vertically extending padded members defining a pair of open frame portions therebetween, a horizontally extending top member connecting said vertically extending members, a pair of transverse members mounted in each of said portions and defining slots therebetween; strapbinding clamping means mounted on said top member, a strap formed at one end for connection to the frame of the escorted vehicle and for threading between said transverse members and for engagement with said clamping means and said transverse members being positioned at about the point of contact of the bumper of the escorted vehicle, a pair of arms connecting said frame and carriage for joint and equal vertical displacement and supporting said frame in fixed longitudinally spaced relation to said carriage and providing a pivotal connection at said carriage about a vertical axis to provide a swinging radius for relative pivotal displacement of the escorting and escorted vehicles, and power means for raising to adjusted elevated positions said carriage and frame thereby raising said straps and the connected end of the escorted vehicle; said power means locking said carriage and frame against vertical displacement in all adjusted elevated positions.

5. In a vehicle escorting apparatus, a bumper pad comprising a plurality of horizontally spaced vertically extending padded members defining a pair of open frame portions therebetween, a horizontally extending top member connecting said vertically extending members, a pair of transverse members mounted in each of said portions and defining slots therebetween; strapbinding clamping means mounted on said top member, a strap formed at one end for connection to the frame of the escorted vehicle and for threading between said transverse members and for engagement with said clamping means, and said transverse members being positioned at about the point of contact of the bumper of the escorted vehicle, and said strapbinding clamping means having a support, a pair of serrated rollers mounted on said support and journalled in spaced parallel relation to define a gripping slot therebetween a pair of gears mounted on and axially of said rollers, a pinion gear enmeshed with said pair of gears for joint rotation of said rollers, said rollers being eccentrically mounted so as to move together upon rotation for tightly gripping said strap and for moving apart upon reverse rotation for releasing said strap, and means for jointly rotating said rollers.

6. A vehicle escorting apparatus comprising; a support adapted for connection to an escorting vehicle at one end thereof; a carriage mounted on said support for vertical reciprocation; a frame comprising, a plurality of horizontally spaced vertically extending padded members defining a pair of open frame portions therebetween, a horizontally extending top member connecting said vertically extending members, a pair of transverse members mounted in each of said portions and defining slots therebetween; strapbinding clamping means mounted on said top member, a strap formed at one end for connection to the frame of the escorted vehicle and for threading between said transverse members and for engagement with said clamping means, and said transverse members being positioned at about the point of contact of the bumper of the escorted vehicle, a pair of arms having a common vertical pivotal attachment to said carriage and diverging longitudinally therefrom and being pivotally connected to said frame for supporting said pad in longitudinally spaced relation to said carriage and providing a swinging radius for relative pivotal displacement of the escorting and escorted vehicles, each of said arms being composed of extensible sections for adjusting the length of said radius and providing said pad with an operable relatively extended position spaced from said carriage by said radius and an inoperable retracted position adjacent said carriage, means for locking said sections in the operable and inoperable positions of said frame, said arms being pivoted to said frame about horizontally spaced vertical axes thereby defining a triangular assembly of said arms and frame, said arms on retraction and extension articulating about said axes to permit movement of said frame in successive parallel positions to and from said support, power means for driving said carriage and frame vertically to adjusted positions relative to said support, said power means locking said carriage and frame against vertical displacement in all adjusted elevated positions, a pair of bed rails spaced to overlie the frame rails of an escorting vehicle and attaching means connecting said bed and frame rails.

References Cited in the file of this patent
UNITED STATES PATENTS

| | | |
|---|---|---|
| 1,435,063 | Holmes | Nov. 7, 1922 |
| 2,495,493 | Wright | Jan. 24, 1950 |
| 2,625,278 | Sensenbaugh | Jan. 13, 1953 |
| 2,661,106 | Morgan | Dec. 1, 1953 |
| 2,705,083 | Soderstrom | Mar. 29, 1955 |
| 2,782,944 | Macklin | Feb. 26, 1957 |
| 3,019,033 | Wegener et al. | Jan. 30, 1962 |